Feb. 3, 1931. L. JOHNSON 1,790,751
SAW SET
Filed March 26, 1930
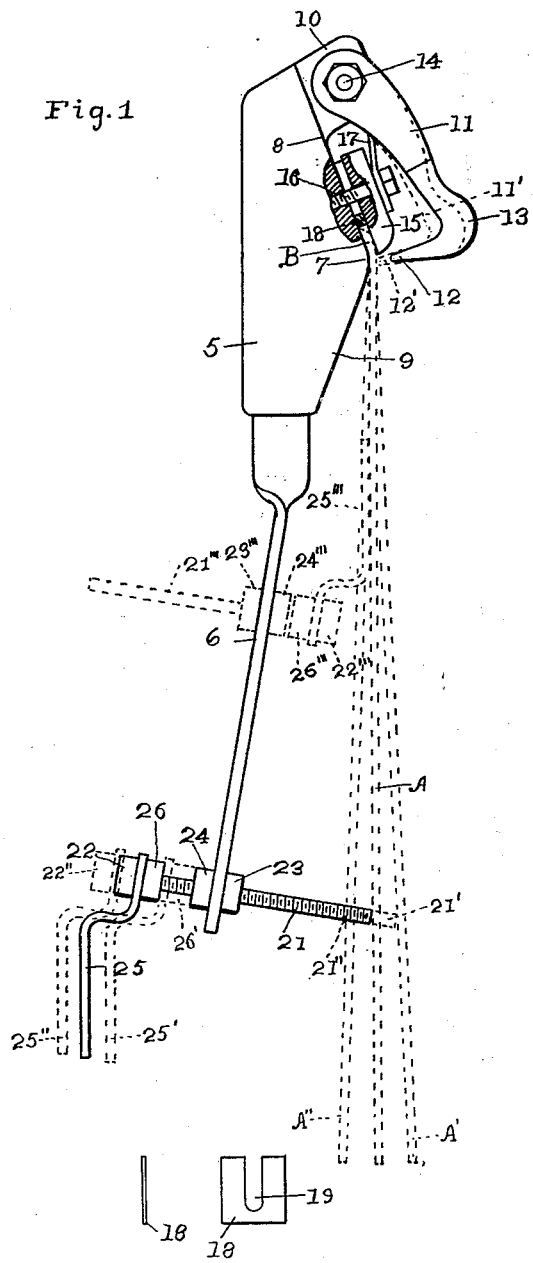
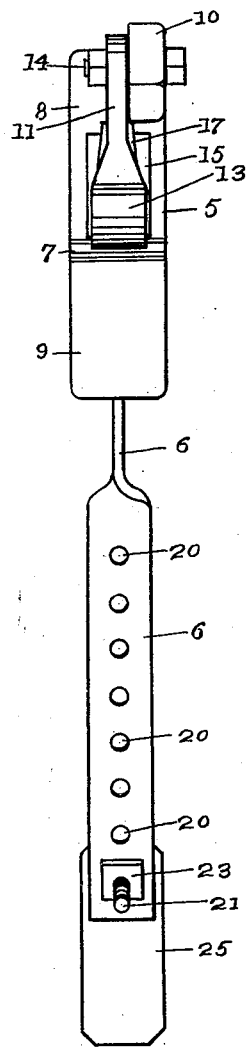
INVENTOR,
Lewis Johnson.
BY David E. Lain,
ATTORNEY.

Patented Feb. 3, 1931

1,790,751

UNITED STATES PATENT OFFICE

LEWIS JOHNSON, OF TEN MILE TOWNSHIP, WHATCOM COUNTY, WASHINGTON

SAW SET

Application filed March 26, 1930. Serial No. 439,057.

My invention relates to improvements in saw sets and has for an object to provide a setting hammer by which the bent saw teeth may be stretched in a narrow area across the center of the exterior arc surface caused by the setting bend therein thus fixing the shape thereof.

Another object of my improvement is to provide a saw set adapted to set all of the teeth of a saw to a uniform shape and to fix the set therein against subsequent change.

Another object of my improvement is to provide a saw set which is adapted to set the teeth of the largest and thickest saws and also those much smaller and thinner.

Another object of my improvement is to provide simple adjustment features suited to cause the setting bend in the teeth at a desired uniform location.

Another object of my improvement is to provide simple adjustment features suited to cause the desired angularity of set in the saw teeth.

Another object of my improvement is to provide a saw set by the use of which uniform setting of saw teeth may be attained by unskilled operatives.

Other objects of my improvement will appear as the description proceeds.

I attain these and other objects of my improvement with the mechanism illustrated in the accompanying sheet of drawings forming a part of this specification in which Figure 1 is a side elevation of my saw set, Fig. 2 is a front elevation of Fig. 1, Fig. 3 is a plan view of one of the adjustment shims and Fig. 4 is an edge view of Fig. 3.

Similar characters refer to similar parts throughout. Certain parts are broken away to show other parts hidden thereby.

With more particular reference to the designated parts: A saw-set anvil block 5 has a thin flat shank 6 fastened to its lower end. The front surface of the block has a higher central transverse surface curved at 7 slanting rearward above at 8 and below at 9. A lug 10 projects forward from one side of the upper end of the block and has a transverse hole therethrough through which is extended bearing bolt 14 on which hammer 11 is mounted for reciprocation. Hammer 11 has thin transverse peen 12 and head 13 suited to receive a blow from a hand hammer.

Tooth plate 15 is fastened in front of the front slanting anvil surface 8 by cap screw 16 engaged in a tapped hole in the anvil at surface 8 disposed with its lower edge adjacent the crown of curved surface 7 and with shim 18 intervening to provide a space between the lower end of the plate and the surface 8 and curved surface 7. Flat spring 17 is fastened beneath the head of cap screw 16 against the plate with its free end bearing beneath hammer 11 and by its reaction tends to maintain peen 12 adjacent curved surface 7 with a short space intervening.

Shims 18, one of which is shown in place in Fig. 1, are of varying thickness to vary the space between the block and plate 15. A thicker shim is shown in Fig. 1 and a thinner one in Figs. 3 and 4. Each shim is provided with notch 19 which, when in place, spans cap screw 16 and the lower end of the shim is set at a desired distance above the lower end of plate 15 to stop the point of a saw tooth placed between the plate and anvil block. The desired position of the shim beneath the plate having been attained it is retained in place by clamping the plate thereon with screw 16.

In shank 6 is a longitudinal row of spaced holes 20 through the lower one of which, as illustrated, is extended stop screw 21. The stop screw is retainable in each of holes 20 to protrude at desired distances in front of the shank by nuts 23 and 24 thereon engaged to bear one on each side of the shank.

Arm 25 has an opening in the upper end through which is extended the stop screw and the arm is retained against head 22 thereof by jam nut 26. The arm is preferably offset to a place beyond screw head 22 from which it is directed downward at 25.

My saw set is well suited for setting the teeth of large and thick circular and drag saws a portion of one of which is shown in Fig. 1 at A, a tooth B of which is engaged between plate 15 and block 5 with its point against shim 18 which bears thereon to support the setting mechanism. When the setting mechanism was first hung on tooth B stop screw 21 was at, say 21″, at the left of saw A free from contact therewith. Then the operative pressed against the arm to cause stop screw 21 to assume its full-line position bearing against saw A when tooth B thereof will be bent around curved surface 7 to the desired angle which is desired to be retained thereby. The operative then strikes head 13 with a hammer causing peen 12 to strike the outer curve of the bent tooth across the entire width thereof with sufficient force to expand the metal thereat and set the same in the shape into which it had been forced. Peen 12, under the reaction of spring 17, moves forward from its dotted position at 12′ in contact with the tooth and hammer 11 from its dotted position at 11′ to their positions shown in full lines at 12 and 11 respectively. Then the setting mechanism is moved to hang on the next tooth but one of the saw and the same procedure is followed resulting in that tooth being set at the same angle and shape as the tooth last referred to.

In this manner every other, or each alternate, tooth is bent and set with my setting implement after which it is reversed and the unset teeth are each set thereby when the job is complete. It may be observed that no special skill is required to attain uniformity in the set of each of the teeth when the work is done with my device.

To adjust the localization of the bend in the teeth with reference to the points thereof shim 18 is set at the desired position beneath plate 15. To adjust for thickness of the teeth a shim 18 slightly thicker than the teeth is placed beneath the plate. To adjust for angularity of the teeth relative to the saw blade the location of the hole 20 and the amount of the projection of stop screw 21 beyond shank 6 are considered. For saws wider than the distance from plate 15 to the topmost hole 20 stop screw 21 is suitable for extension through any one of holes 20 where it may be held in the desired place by clamping nuts 23 and 24. But for saws narrower than said distance the stop screw is extended through the shank from the front thereof as at 21‴ where it is retained by clamping nuts 23‴ and 24‴, and arm 25 is turned upward as at 25‴ to bear against the saw blade of narrow saws and determine the angle at which the teeth thereof will be bent.

As stated, the position of screw 21 in the shank determines the angle at which the teeth will be bent. In Fig. 1 two dotted-line locations of this are given. One with the screw at 21′ which bears on the saw when at A′ and one with the screw at 21″ which bears on the saw when at A″. The former diminishes the angularity of the bend in tooth B and the latter increases said bend relative to that when the screw is at 21 and the saw at A.

The shape and relative dimensions of my device herewith illustrated are those found useful in practice. They may be considerably changed for more convenient manufacture or to better suit other sizes of saws and teeth without departing from the scope of my invention.

Having thus disclosed my invention, what I claim as new therein and desire to secure by Letters Patent is:

1. A saw set including an anvil block having a transverse central obtuse-angle front, a shank fastened to the lower end of the block, having spaced holes therethrough, a plate fastened to the front of the block above the angle thereof, a stop shim clamped between the plate and block providing a saw tooth recess therebetween at the lower end of the plate, an oscillatable hammer pivoted on the upper end of the block, a narrow peen on the head of the hammer disposed transverse of the block adjacent and below the lower end of the plate opposite the block angle, and a stop screw securable in any one of the shank holes protruding forward therefrom.

2. A saw set including an anvil block having a transverse central obtuse-angle front, a shank fastened to the lower end of the block having spaced holes therethrough, a plate fastened to the block front above the angle thereof, a stop shim clamped between the plate and the block providing a tooth recess therebetween at the lower end of the plate adapted for adjustable setting to increase or diminish the height of the tooth recess, an oscillatable hammer pivoted on the upper end of the block, a narrow peen on the head of the hammer disposed transverse of the block adjacent and below the lower end of the plate opposite the block angle, a spring fastened to the block reacting on the hammer to retain the peen apart from the block, and a stop screw engageable in each of the shank holes with its front end settable at variable distances therefrom.

3. A saw set including an anvil block, a shank having holes therethrough fastened to the lower end of the block, a plate fastened to the front of the block, a stop shim clamped between the plate and the block providing a saw-tooth recess therebetween, an oscillatable hammer pivoted to the block, a peen on the head of the hammer disposed transverse of the block adjacent and below the plate, a screw clampable in each of the shank holes, and a stop arm clampable on the screw settable at variable distances from the shank.

LEWIS JOHNSON.